US006424514B1

(12) United States Patent
Boy et al.

(10) Patent No.: US 6,424,514 B1
(45) Date of Patent: Jul. 23, 2002

(54) SURGE VOLTAGE PROTECTOR WITH AN EXTERNAL SHORT-CIRCUITING DEVICE

(75) Inventors: Jürgen Boy; Krost Norbert, both of Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/462,753

(22) PCT Filed: Jul. 14, 1998

(86) PCT No.: PCT/DE98/02011

§ 371 (c)(1), (2), (4) Date: Apr. 5, 2000

(87) PCT Pub. No.: WO99/04468

PCT Pub. Date: Jan. 28, 1999

(30) Foreign Application Priority Data

Jul. 15, 1997 (DE) ........................................ 197 31 312

(51) Int. Cl.[7] ................................................ H02H 1/00

(52) U.S. Cl. ...................... 361/119; 361/120; 361/124; 361/129

(58) Field of Search ................................ 361/118, 119, 361/120, 124, 126, 127, 128, 129; 337/28, 31, 32, 33

(56) References Cited

U.S. PATENT DOCUMENTS

| | | | | |
|---|---|---|---|---|
| 4,362,962 | A | 12/1982 | Lange | 174/94 R |
| 4,433,354 | A | 2/1984 | Lange et al. | 361/120 |
| 4,984,125 | A | 1/1991 | Uwano | 361/124 |
| 5,029,302 | A | 7/1991 | Masghati et al. | 361/119 |
| 5,187,634 | A | 2/1993 | Pitsch et al. | 361/119 |

FOREIGN PATENT DOCUMENTS

| | | | |
|---|---|---|---|
| DE | 29 11 110 | 9/1980 | H01T/3/00 |
| FR | 2 621 184 | 3/1989 | H01T/1/14 |
| WO | WO 90/13904 | 11/1990 | H01H/83/10 |

*Primary Examiner*—Ronald W. Leja
(74) *Attorney, Agent, or Firm*—Kenyon & Kenyon

(57) ABSTRACT

In order to give an external short-circuit device of a surge voltage protector a current carrying capacity that is as large as possible, a device is made up of a two-armed flexible short-circuit clip whose contact regions are arranged axially to end electrodes. The contact region is formed by two brackets that release a center region of the respective end electrode, and that stand opposite an edge region. An insulating spacer is arranged between a common base of the contact brackets and the edge region of the respective.

7 Claims, 2 Drawing Sheets

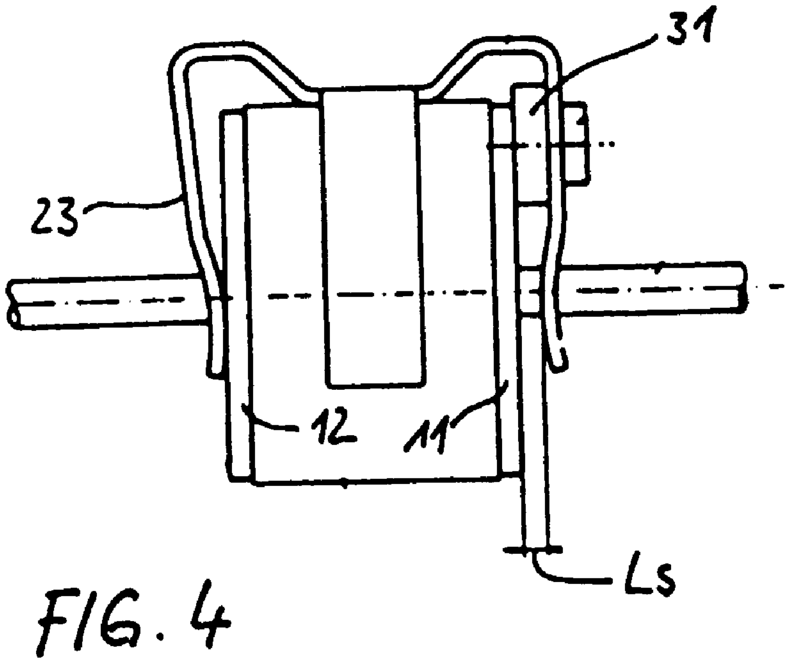
FIG. 4
FIG. 5
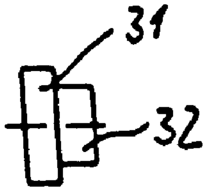
FIG. 6
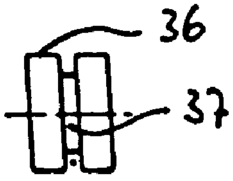
FIG. 7
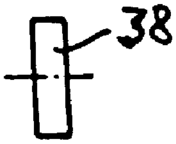

SURGE VOLTAGE PROTECTOR WITH AN EXTERNAL SHORT-CIRCUITING DEVICE

FIELD OF THE INVENTION

The present invention relates to electrical components, in particular a surge voltage protector that is provided with an external short-circuit device.

BACKGROUND INFORMATION

Short-circuit devices of this sort are standard both in two-electrode and in three-electrode surge voltage protectors. Such surge protectors usually have a cylindrical construction, the electrodes being arranged so as to be insulated from one another. The short-circuit devices protect the surge voltage protector in long-term load situations; as a rule, such a short-circuit device contains a constructive element that can melt at higher temperatures, with the aid of which the two electrodes, or the center electrode and one or both end electrodes, can be short-circuited.

For three-electrode protectors, an external short-circuit device is described in U.S. Pat. No. 4,984,125 that is made up of a flexible clip that extends along the axis of the surge voltage protector and is placed onto the center electrode using a clamp. The free ends of the two arms of this spring clip are placed axially rather than radially on the end face of the two end electrodes, with the intermediate connection of an insulating plastic element that is arranged centrically in relation to the respective end electrode and can melt in the case of an overload. The end of each arm of the spring clip is fashioned as a contact bracket that extends diagonally past the plastic spacer element, and that contacts the end surface of the respective end electrode in its edge region in the case of a short circuit.

In addition, there are conventional short-circuit devices that can be used both for two-electrode and for three-electrode surge voltage protectors. These short-circuit devices are likewise made up of a flexible clip having two free ends that are applied axially to the end electrodes. In surge voltage protectors having two electrodes, a fusible insulating film is arranged between the one free end of the flexible short-circuit clip and the associated electrode; in the case of a short circuit this film is punctured by the contact region of the free end of the short-circuit clip. In French Patent No. 2 621 184, this contact region can here be constructed, in the manner of a fork, from two flat contact brackets, provided that the surge voltage protector is provided with axially soldered-on terminal wires. In surge voltage protectors having three electrodes as described in U.S. Pat. No. 5,029,302 and PCT Application No. WO 90/13904, the short-circuit clip contacts the center electrode, and its free ends are applied axially to the end surfaces of the two end electrodes, with intermediate connection of an insulating film that is arranged eccentrically, in the edge region of the respective electrode.

For a two-electrode surge protector, German Patent No. 29 11 110 describes a flexible short-circuit clip whose flexible end is held radially at a distance from the electrode that is to be contacted in case of overload, and whose other end is made up of two fastening tongues that are welded to the edge region of the end face of the other electrode.

In a three-electrode surge voltage protector having a flexible short-circuit clip, as described in U.S. Pat. No. 5,187,634, a specially shaped injection-molded part is provided as an insulating spacer that is placed on the protector in the manner of a saddle and has a stirrup-type piece at both ends. The foot region of the respective stirrup forms the actual spacer for the flexible contact brackets of the spring clip. Each contact bracket is fashioned with two tongues. The two contact tongues have a common base region, are separated from one another by a small slot, are adjacent to the spacer arranged eccentrically to the respective end electrode, and extend radially past the spacer.

SUMMARY OF THE INVENTION

An object of the present invention is to provide a robust short-circuit device that is constructed as simply as possible, is suited for surge voltage protectors having axially welded-on terminal wires, and has a high capacity for carrying alternating current (max. 30 amp/15 min per discharge path).

In order to achieve this object, the present invention provides that the contact brackets release between them the center region of the first electrode, that the spacer is arranged between the common base region of the contact bracets and the end surface of the first electrode, and that the common base region of the contact brackets has a slot in which the insulating spacer is fixed with a retention piece. The retention piece can be fashioned as a short cylindrical support, or also can be formed by an annular recess that is, for example, incorporated in the jacket surface of a cylindrical body.

Such a construction of the short-circuit device enables—independent of whether and how (projecting radially or axially) the terminal wires are connected to the end-face electrodes—contact over a large surface to the end-face electrodes by the forming-out of two contact brackets, which achieve contacting in the edge region of the electrodes without being damaged by molten insulating material. The spacer, which is arranged relatively far away from the contact points, can be fashioned very small; in particular it can be fashioned as a cylindrical body, which constructively facilitates the local fixing of the spacer or spacers.

The short-circuit device constructed according to the present invention is usefully applied for surge voltage protectors having two electrodes, of which the second electrode forms the other end face of the surge voltage protector and is held at a distance from the first electrode by a tube-shaped insulator, in such a way that the short-circuit clip is fashioned symmetrically in the axial direction of the surge voltage protector, and is fixed to the insulator by a bracket. Here the other end of the short-circuit clip can likewise be held at a distance from the second electrode by a spacer; the other end of the short-circuit clip can however also be applied directly to the second electrode.

The application of the short-circuit clip constructed according to the present invention in surge voltage protectors having three electrodes, of which the second electrode forms the other end face of the surge voltage protector and the third electrode is arranged between the first and second electrode and is insulated from these electrodes by a first and second hollow cylindrical insulator, usefully takes place in such a way that the short-circuit clip is likewise of symmetrical construction in the axial direction, and is placed on the third electrode using a bracket.

BRIEF DESCRIPTION OF THE DRAWINGS

FIG. 4 shows a variant of the surge protector shown in FIG. 3.

FIG. 5 shows a first embodiment of an insulating spacer.

FIG. 6 shows a second embodiment of an insulating spacer.

FIG. 7 shows a third embodiment of an insulating spacer.

DETAILED DESCRIPTION

Figure 1:
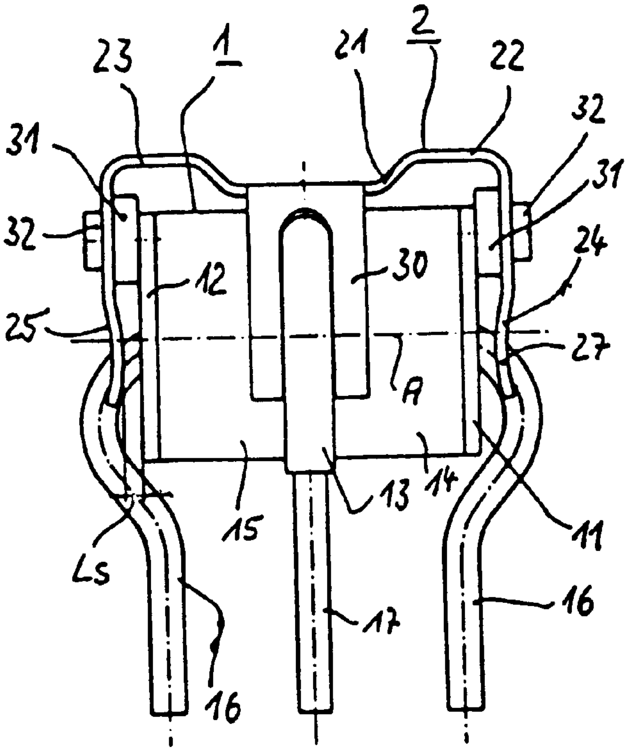
FIG. 1 shows a first view of a three-electrode surge voltage protector.
Figure 2:
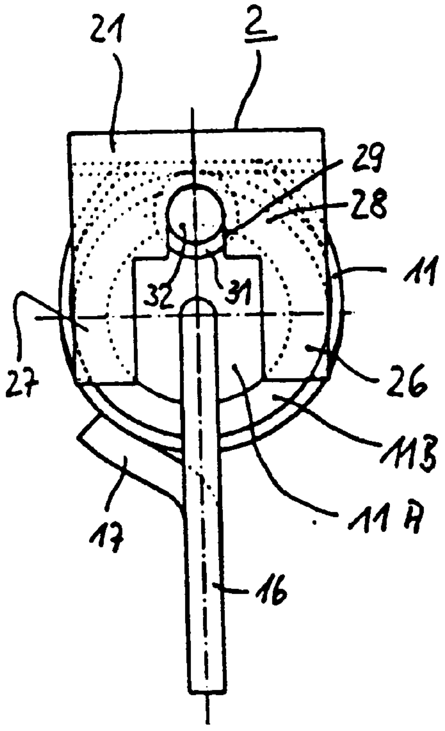
FIG. 2 shows a second view of a three-voltage surge voltage protector.

Surge voltage protector 1 according to FIGS. 1 and 2 has a first end electrode 11, a second end electrode 12 and a third electrode 13 that is fashioned as a center electrode and is arranged so as to be insulated from two end electrodes 11 and 12 by tube-shaped insulators 14 and 15. All the electrodes are made of copper, and are fashioned similarly to the configuration shown in U.S. Pat. No. 4,433,354. Here two end electrodes 11 and 12 are provided with axially welded-on terminal wires 16, in particular according to FIG. 1 of U.S. Pat. No. 4,362,962. Center electrode 13 is provided with a tangentially welded-on terminal wire that runs radially.

Surge voltage protector 1 is equipped with a short-circuit device 2 that is essentially made up of a two-armed flexible short-circuit clip 21 and two insulating spacers 31. Short circuit clip 21 has two arms 22 and 23 that run parallel to the longitudinal axis of the surge voltage protector; in the region of the two end electrodes, these arms are angled off perpendicular to the longitudinal axis A, and they subsequently run approximately parallel to the end surfaces of two end electrodes 11 and 12. The ends of arms 22 and 23 form contact regions 24 and 25, which according to FIG. 2 are each made up of two contact brackets 26 and 27. The contact brackets release center region 11 A of the respective end electrode, the actual contact surface standing opposite edge region 11 B of the respective electrode.

Contact brackets 26 and 27 have a common base 28 that is provided with a slot 29. A retention piece 32 of insulating spacer 31 is placed into this slot 29. The insulating spacer is thus located between common base 28 and edge region 11 B of the respective end electrode, and is dimensioned such that an air gap Ls is maintained between contact brackets 26, 27 and edge region 11 B of the end electrodes.

Short-circuit clip 21 is also provided with a bracket 30 that surrounds insulators 14 and 15 at more than half their perimeter, and with the aid of which the short-circuit clip is seated on center electrode 13.

Figure 3:
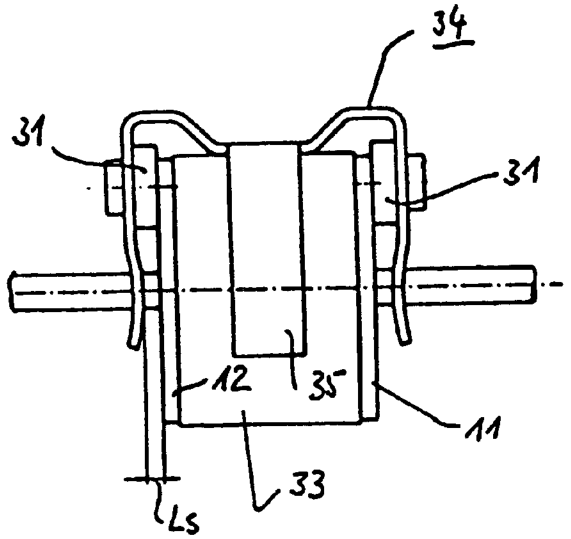
FIG. 3 shows a side view of a two-voltage surge protector.

The surge voltage protector according to FIG. 3 is a two-electrode surge protector having two end electrodes 11 and 12 that are insulated from one another by insulator 33. The short-circuit device is constructed according to the short-circuit device according to FIGS. 1 and 2, and is made up of a spring clip 34 and two insulating spacers 31. Bracket 35 is placed directly on insulator 33 without causing an electrical contacting there.

According to FIG. 4, in the surge voltage protector according to FIG. 3 one insulating spacer 31 can also be omitted, so that the contact region of flexible arm 23 is always applied directly to the end-face edge region of end electrode 11.

FIG. 5 shows insulating spacer 31 having retention piece 32. As shown in FIG. 6, the insulating spacer can be made from a cylindrical part 36 that is provided with an annular recess 37 with which the spacer can be inserted into slot 29 of contact regions 24 and 25. As shown in FIG. 7, the spacer can also be made only of a disk 38 that is then inserted between common base 28 of brackets 26 and 27 and edge region 11 B of the respective electrode, and is held fast there by the spring tension of arms 22, 23.

What is claimed is:

1. A surge voltage protector having a cylindrical construction, comprising:

at least one first electrode forming a first end face of the surge voltage protector;

a second electrode arranged so as to be insulated from the first electrode;

a flexible short-circuit clip having an end, the end of the flexible short-circuit clip having a contact region allocated to an edge region of an end surface of the at least one first electrode;

two contact brackets proceeding from a common base region and forming the contact region of the flexible short-circuit clip, the two contact brackets leaving uncovered a center region of the first electrode;

an insulating spacer arranged eccentrically to the at least one first electrode and between the common base region of the contact brackets and the end surface of the at least one first electrode, the insulating spacer holding the contact region of the short-circuit clip axially at a distance from the at least one electrode, the insulating spacer being meltable in the case of an overload; and a retention piece fixing the insulating spacer in a slot of the common base region of the two brackets.

2. The surge voltage protector according to claim 1 wherein the retention piece is formed by an annular recess.

3. The surge voltage protector according to claim 1, wherein the at least one first electrode includes two electrodes, the surge voltage protector further comprising:

a tube-shaped insulator arranged between the two electrodes, the flexible short-circuit clip being fashioned symmetrically in an axial direction of the surge voltage protector and fixed on the tube-shaped insulator by a bracket.

4. The surge voltage protector according to claim 3, wherein an end face of the short-circuit clip lies directly on at least one of the at least one first electrode.

5. The surge voltage protector according to claim 1, wherein the at least one first electrode includes two electrodes, each of the two electrodes forming different end faces of the surge voltage protector, the surge voltage protector further comprising:

first and second hollow cylindrical insulators, the second electrode being arranged between the two electrodes and being insulted from the two electrodes via the first and second hollow cylindrical insulators; and a bracket, the flexible short-circuit clip being fashioned symmetrically in the axial direction and seated on the second electrode using the bracket.

6. The surge voltage protector according to claim 1, wherein the retention piece extends through the slot of the common base region.

7. The surge voltage protector according to claim 1, wherein the retention piece extends into the slot of the common base region.

* * * * *

UNITED STATES PATENT AND TRADEMARK OFFICE

CERTIFICATE OF CORRECTION

PATENT NO. : 6,424,514 B1
DATED : July 23, 2002
INVENTOR(S) : Boy et al.

It is certified that error appears in the above-identified patent and that said Letters Patent is hereby corrected as shown below:

Column 4,
Line 51, change “insulted” to -- insulated --.

Signed and Sealed this

Eighteenth Day of March, 20033

JAMES E. ROGAN
*Director of the United States Patent and Trademark Office*